(12) United States Patent
Ahn

(10) Patent No.: US 7,655,850 B1
(45) Date of Patent: Feb. 2, 2010

(54) UNIVERSAL QUANTUM GATE

(75) Inventor: Doyeol Ahn, Seoul (KR)

(73) Assignee: University of Seoul Industry Cooperation Foundation, Seoul (KR)

( * ) Notice: Subject to any disclaimer, the term of this patent is extended or adjusted under 35 U.S.C. 154(b) by 0 days.

(21) Appl. No.: 12/198,842

(22) Filed: Aug. 26, 2008

(51) Int. Cl.
*H03K 19/20* (2006.01)

(52) U.S. Cl. .................. 977/933; 977/774; 326/104; 326/136

(58) Field of Classification Search .......... 326/104, 326/136; 977/774, 933
See application file for complete search history.

(56) References Cited

U.S. PATENT DOCUMENTS

| | | | | |
|---|---|---|---|---|
| 5,768,297 A | * | 6/1998 | Shor | 714/763 |
| 6,301,029 B1 | * | 10/2001 | Azuma | 359/107 |
| 6,456,994 B1 | * | 9/2002 | Tucci | 706/52 |
| 7,113,967 B2 | * | 9/2006 | Cleve et al. | 708/403 |
| 2005/0059167 A1 | * | 3/2005 | Vitaliano et al. | 436/518 |
| 2005/0110106 A1 | * | 5/2005 | Goto et al. | 257/432 |
| 2006/0141775 A1 | * | 6/2006 | Schuehrer et al. | 438/638 |
| 2008/0142787 A1 | * | 6/2008 | Loss | 257/25 |
| 2009/0033369 A1 | * | 2/2009 | Baumgardner et al. | 326/104 |

OTHER PUBLICATIONS

Ahn, "Intervalley interactions in Si quantum dots", Journal of Applied Physics, 98, pp. 033709-1-033709-7 (2005).

* cited by examiner

*Primary Examiner*—Vibol Tan
*Assistant Examiner*—Jason Crawford
(74) *Attorney, Agent, or Firm*—Knobbe Martens Olson & Bear LLP (57) ABSTRACT

Universal quantum gates that include single qubit and two-qubit gates are provided.

21 Claims, 4 Drawing Sheets

Qubit operation on dot 1

UNIVERSAL QUANTUM GATE

BACKGROUND

Quantum computing utilizes quantum particles to carry out computational processes. The fundamental unit of quantum information is called a quantum bit or qubit. Semiconductor implementation of quantum bits and quantum gates is of current technological interest for scalable quantum computation. One of the most formidable challenges, among the stringent requirements for the implementation of solid-state qubit, may be minimizing decoherence effects on the fragile quantum states. Thus, current approaches for the solid state qubits are mostly based on the coherent quantum state of a nuclear spin of impurity atoms implanted on the surface of silicon (Si) and the electron spin confined in the quantum dots. Recently, research and development in the implementation of spin based qubit have been substantial, which include the isolation of electron spin states in coupled quantum dots, coherent exchange of two spins in a double dot system, single electron spin evolution under a static magnetic field, and the realization of Rabi oscillation of a single electron spin.

Quantum gate operation of the spin qubits may utilize the Heisenberg interaction or the exchange interaction. It is well known that the Heisenberg interaction alone may not provide a universal quantum gate because it has too much symmetry. Moreover, in order to control the Heisenberg interaction in quantum dots, both static and dynamic magnetic fields are likely required. Therefore, implementation is needed such that a single physical state can possibly constitute one logical qubit with a universal gate operation that is substantially electrically controlled.

SUMMARY

Various embodiments of universal quantum gates are disclosed herein. In one embodiment by way of non-limiting example, a universal quantum gate includes a single qubit gate including a quantum dot, the quantum dot to include a qubit. The qubit, for example, may be represented by a state from among polarized intervalley states of an electron in the quantum dot. The universal quantum gate further includes a two-qubit gate coupled to the single qubit gate. The two-qubit gate, for example, includes a first quantum dot and a second quantum dot. The first quantum dot, for example, to include a first qubit, the first qubit may be represented by a state from among polarized intervalley states of an electron in the first quantum dot. The second quantum dot, for example, to include a second qubit, the second qubit may be represented by a state from among polarized intervalley states of an electron in the second quantum dot. Gate voltages, for example, may be applied to the first quantum dot and the second quantum dot. These gate voltages, for example, may be adjusted such that an energy level of the representative states of the first and second qubits is based on an integer multiple of an inter-dot Coulomb-energy level.

In another embodiment, a universal quantum gate includes a first single qubit gate and a second qubit gate. The first and the second single qubit gates each may include a quantum dot, the quantum dot to include a qubit, the qubit may be represented by a state from among polarized intervalley states of an electron in the quantum dot. The universal quantum gate may also include a first two-qubit gate and a second two-qubit gate. The first and the second two-qubit gates may each include a first quantum dot and a second quantum dot. The first quantum dot, for example, may include a first qubit, the first qubit may be represented by a state from among polarized intervalley states of an electron in the first quantum dot. The second quantum dot, for example, may include a second qubit, the second qubit may be represented by a state from among polarized intervalley states of an electron in the second quantum dot. In this other embodiment, the first single qubit gate is coupled to the first quantum dot of the first two-qubit gate, the first quantum dot of the first two-qubit gate is coupled to the second single qubit gate, the second single qubit gate is coupled to the first quantum dot of the second two-qubit gate, the second quantum dot of the first two-qubit gate is coupled to the second quantum dot of the second two-qubit gate. Gate voltages, for example, may be applied to each of the first and second quantum dots of the first and second two-qubit gates. These gate voltages, for example, may be adjusted such that an energy level of the representative states of the first and second qubits are based on an integer multiple of an inter-dot Coulomb-energy level.

In still another embodiment, a quantum universal gate includes a two-qubit gate including a first quantum dot and a second quantum dot. The first quantum dot, for example, to include a first qubit that may be represented by a state from among polarized intervalley states of an electron in the quantum dot. The second quantum dot, for example, may include a second qubit that may be represented by a state from among polarized intervalley states of an electron in the second quantum dot. In this other embodiment, gate voltages, for example, may be applied to the two quantum dots of the two-qubit gate. These gate voltages, for example, may be adjusted such that the two-qubit gate may perform a pseudo swap operation.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the components of the present disclosure, as generally described herein, and illustrated in the Figures, may be arranged, substituted, combined, and designed in a wide variety of different configurations, all of which are explicitly contemplated and made part of this disclosure.

Figure 1:
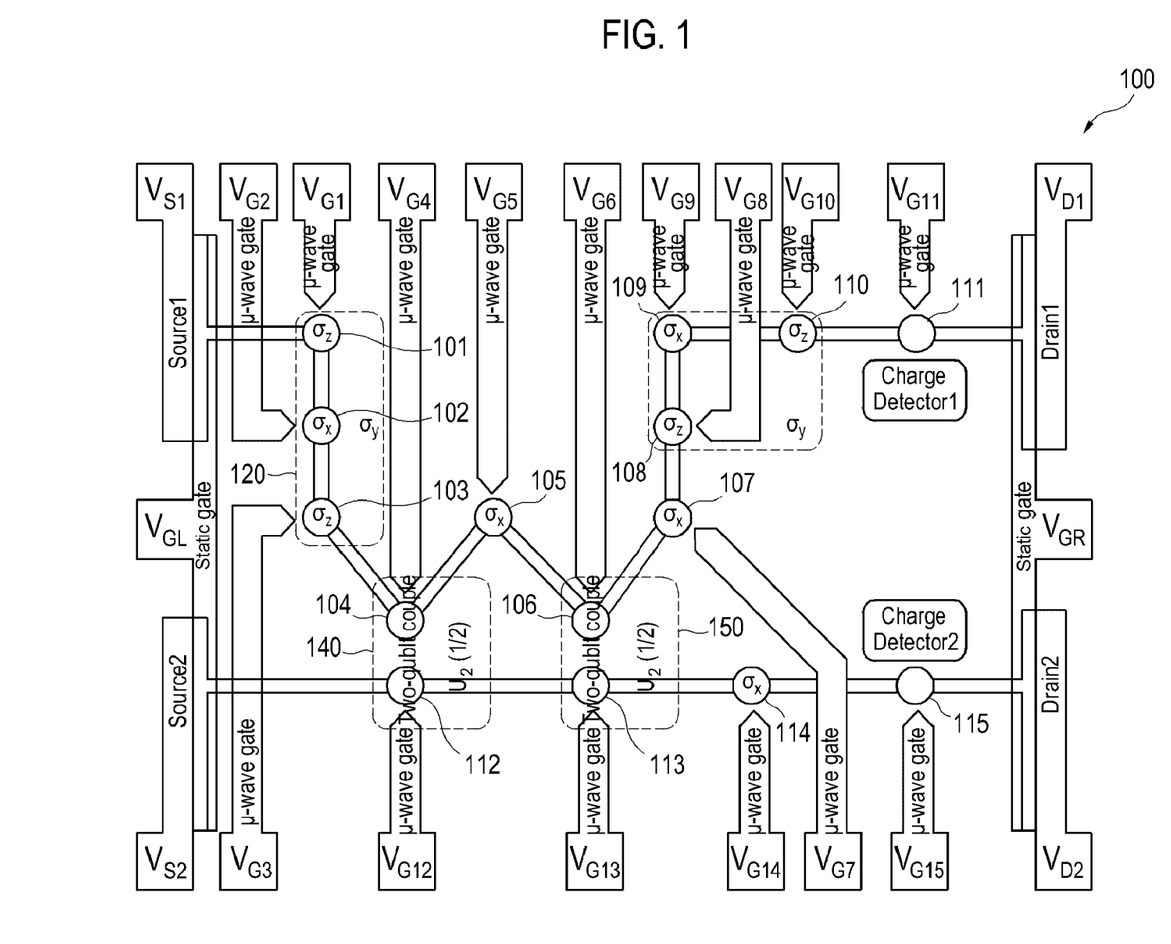
FIG. 1 is a diagram showing an illustrative embodiment of a universal controlled NOT (CNOT) quantum gate.

FIG. 1 is a diagram showing an illustrative embodiment of a universal controlled NOT (CNOT) quantum gate 100. In one example, as depicted in FIG. 1, the universal CNOT quantum gate 100 may include a $U_2$ (1/2) pseudo-SWAP gate 140, 150 having two quantum dots 104, 112 or 106, 113 and a single qubit gate 101, 102, 103, 105, 107, 108, 109, 110 having one quantum dot (hereinafter the reference numerals 101, 102, 103, 105, 107, 108, 109, 110 may refer to the single qubit gate or the quantum dot therein). Hereinafter, a SWAP gate may include a gate having two coupled qubits and operating to swap the two coupled qubits, and a swap operation means the swap operation of the SWAP gate. The universal CNOT quantum gate 100 may further include a quantum dot 111, 115 for charge detection.

In one example, the quantum dots 101-115 may be placed at a distance based, at least in part, on the required quantum bit (qubit) operation. The universal CNOT quantum gate 100, for example, may include a drain electrode $V_{D1}$, $V_{D2}$ connected to the quantum dot 111, 115 for charge detection and a source electrode $V_{S1}$, $V_{S2}$ corresponding to the drain electrode $V_{D1}$, $V_{D2}$ and connected to the quantum dot 101, 112. The universal CNOT quantum gate 100 may include a control gate electrode $V_{G1}$-$V_{G15}$ provided with a microwave pulse generator to control the qubit operation in each quantum dot 101-115. The universal CNOT quantum gate 100 may further include a gate electrode $V_{GL}$ corresponding to the source electrode $V_{S1}$, $V_{S2}$ and a gate electrode $V_{GR}$ corresponding to the source electrode $V_{D1}$, $V_{D2}$. In one embodiment, the control gates $V_{G1}$-$V_{G15}$ and the gate electrodes $V_{GL}$, $V_{GR}$ may be placed via insulation material (not shown) from the source electrodes $V_{S1}$, $V_{S2}$, the drain electrodes $V_{D1}$, $V_{D2}$ and the quantum dots 101-115.

The universal CNOT quantum gate 100 may perform a CNOT operation as shown in example Equation 1.

$$U_{CNOT} = \begin{pmatrix} 0 & 1 & 0 & 0 \\ 1 & 0 & 0 & 0 \\ 0 & 0 & 1 & 0 \\ 0 & 0 & 0 & 1 \end{pmatrix} \quad \text{[Equation 1]}$$

$$= R_y^1(\mp\pi/2) R_x^1(\pi/2) R_x^2(\pm\pi/2) \cdot$$

$$U_2(1/2) R_x^1(\pi) U_2(1/2) R_y^1(\pm\pi/2)$$

Where $R_\alpha^n(\theta) = \exp(i\theta\sigma_\alpha/2)$ is the $\sigma_\alpha$ operation with rotation angle $\theta$ on the quantum dot related to the nth qubit and $\sigma_\alpha$, $U_2(\alpha)$ are as shown in example Equations 2-4.

$$\sigma_x = \begin{pmatrix} 0 & 1 \\ 1 & 0 \end{pmatrix}, \sigma_y = \begin{pmatrix} 0 & -i \\ i & 0 \end{pmatrix}, \sigma_z = \begin{pmatrix} 1 & 0 \\ 0 & -1 \end{pmatrix} \quad \text{[Equation 2]}$$

$$R_y(\theta) = -R_z(3\pi/2) R_x(\theta) R_z(\pi/2) \quad \text{[Equation 3]}$$

$$U_2(a) = \begin{pmatrix} e^{-i8\pi\alpha} & 0 & 0 & 0 \\ 0 & \cos(\pi\alpha/2) & -i\sin(\pi\alpha/2) & 0 \\ 0 & -i\sin(\pi\alpha/2) & \cos(\pi\alpha/2) & 0 \\ 0 & 0 & 0 & e^{i8\pi\alpha} \end{pmatrix} \quad \text{[Equation 4]}$$

The right end operation $R_y^1(\pm\pi/2)$ in example Equation 1 may be performed by combining the operations of the single qubit gate 101, 102, 103. Referring to example Equation 3, the single qubit gate 101, 102, 103 may perform $\sigma_z$ operation with rotation angle $\pi/2$, $\sigma_x$ operation with rotation angle $\pm\pi/2$, and $\sigma_z$ operation with rotation angle $3\pi/2$, respectively to form a single qubit operation 120 equal to $R_y(\pm\pi/2)$. To help explain $\sigma_x$, the $\sigma_z$ operation in a single qubit gate, FIG. 2 which, shows an illustrative embodiment of a single qubit gate should be referred.

Figure 2:
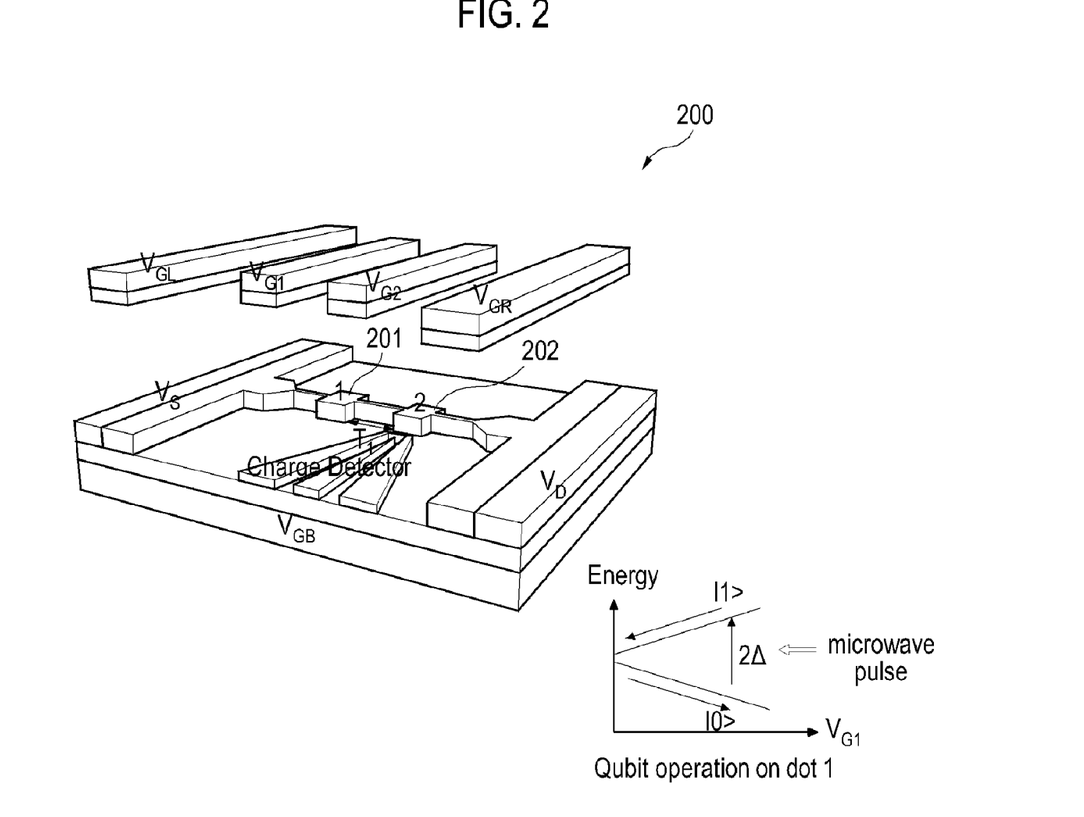
FIG. 2 is a diagram showing an illustrative embodiment of a single qubit gate.

As illustrated in FIG. 2, the single qubit gate 200 is similar to the universal CNOT quantum gate 100. The single qubit gate 200 may include a quantum dot 201 for qubit operation and a quantum dot 202 for readout (charge detection). The single qubit gate 200 may include a gate electrode $V_{G1}$, $V_{G2}$ to apply a gate voltage to the quantum dot 201, 202, respectively. Note that the example single qubit gate 101, 102, 103, 105, 107, 108, 109, 110 illustrated in FIG. 1 does not include a readout quantum dot. This is because, for example, the readout quantum dot is coupled to the end of the overall operations.

In one example, qubit in the quantum dot 201 may be represented by a state from among the polarized intervalley states of an electron in quantum dot 201. Due to its electronic structure, the ground state of an electron in silicon crystal, for example, may be split into two states; symmetric state and anti-symmetric state. Polarized intervalley states, for example, may include these two states. Hereinafter, the symmetric state is denoted by |0> and the anti-symmetric state is denoted by |1>. The symmetric state |0> and the anti-symmetric state |1> may be represented by a 2-dimensional vector as shown in example Equation 5.

$$|0> = \begin{pmatrix} 1 \\ 0 \end{pmatrix}, \ |1> = \begin{pmatrix} 0 \\ 1 \end{pmatrix} \quad \text{[Equation 5]}$$

In one example, the electron orbitals associated with polarized intervalley states may be represented by Hamiltonian H as shown in example Equation 6.

$$H = \begin{bmatrix} \varepsilon_0(F) & \Delta(F) \\ \Delta(F) & \varepsilon_1(F) \end{bmatrix} \quad \text{[Equation 6]}$$

where $\epsilon_0$ and $\epsilon_1$ are the energy levels of the symmetric state |0> and the anti-symmetric state |1>, respectively, $\Delta$ an intervalley splitting energy (energy difference between the anti-symmetric state |1> and symmetric state |0>) and F an external electric field along the direction in which the orbitals are placed. The intervalley splitting energy $\Delta$ may be represented by example Equation 7.

$$\Delta(F) \approx \quad \text{[Equation 7]}$$

$$2\left| \int d\vec{r} \exp(-2iK_o z) |\Psi_0(\vec{r})|^2 \left( 1.045 V(\vec{r}) + \frac{0.414}{K_0} \frac{\partial V(\vec{r})}{\partial z} \right) \right|$$

where $K_0 = 0.85 \times 2\pi/a$, a is the silicon lattice constant, $\Psi_0$ is the ground state of a single valley (degenerated ground state), and $V(\vec{r}) = V_C(\vec{r}) + eFz$ with $V_C$ the quantum dot confinement potential.

As can be seen from example Equations 6 and 7, the intervalley splitting energy $\Delta$, for example, relates to external electric field F and the quantum dot confinement potential $V_C$, i.e., dimension c of the quantum dot. In one example, by varying the external electric field F and the dimension c of the quantum dot, the intervalley splitting energy Δ of a quantum dot has been calculated. In calculation, it may be assumed, for example, that the quantum dot is composed of Si well and $SiO_2$ barrier, and the lateral dimensions a, b of the quantum dot are 8 nm. In one embodiment, the quantum structure may include Si well and Si—Ge barrier. The calculation results are depicted in FIG. 3.

Figure 3:
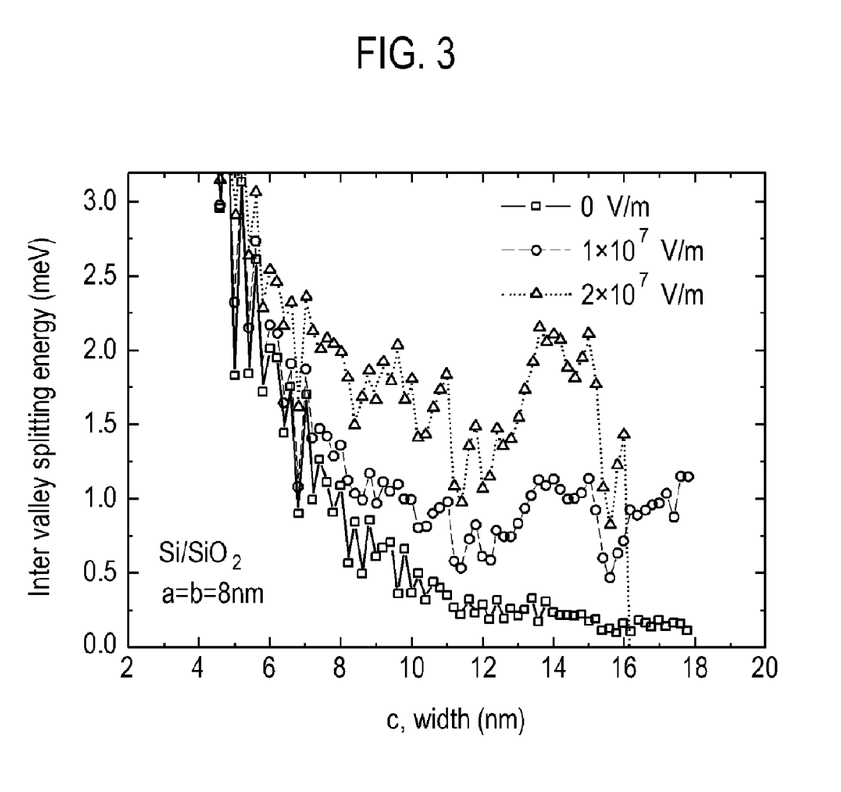
FIG. 3 shows an illustrative embodiment of a relationship among an intervalley splitting energy, a quantum dot dimension and an external electric field.

FIG. 3 shows an illustrative embodiment of a relationship among an intervalley splitting energy Δ, a quantum dot dimension c and an external electric field F. As illustrated in FIG. 3, as the dimension c of the quantum dot increases, the intervalley splitting energy Δ decreases. For example, without F, when the dimension c of the quantum dot is 5 nm and 10 nm, the intervalley splitting energy Δ is 2-3 meV and 0.3-0.5 meV, respectively. When the external electric field F is applied to the quantum dot, for example, the decrease in the intervalley splitting energy Δ gets slower. For example, with F $1\times10^7$ V/m, when the dimension c of the quantum dot is 5 nm and 10 nm, the intervalley splitting energy Δ is 2.75-3 meV and 0.8 meV, respectively. As the external electric field F increases, for example, the decrease in the intervalley splitting energy Δ gets much slower. For example, with F $2\times10^7$ V/m, when the dimension c of the quantum dot is 5 nm and 10 nm, the intervalley splitting energy Δ is 2.75-3 meV and 1.5 meV, respectively.

As illustrated in FIG. 3, for example, polarized intervalley states may be controlled by adjusting the quantum dot dimension c and the external electric field F, i.e., gate voltage. For example, the intervalley splitting energy Δ may be controlled to 0.5 meV by setting a, b, c=8 nm at zero electric field, and may be increased up 1.0 meV by setting a, b, c=8 nm at electric field F $1\times10^7$ V/m.

Referring again to FIG. 2, and quantum dot 201, in one example, the symmetric state |0> may be evolved to the anti-symmetric state |1> coherently, i.e., without destroying the quantum state by applying a sharp voltage pulse to the pulse gate $V_{G1}$. The coherent oscillation, for example, may be characterized by an angular frequency as shown in example Equation 8.

$$\Omega = \sqrt{\epsilon^2 + \Delta^2}/\eta \qquad \text{[Equation 8]}$$

where ε is the energy level without the intervalley splitting and η is the reduced Plank's constant $$\left(h - bar; \quad \eta = \frac{h}{2\pi} = 6.58211899 \times 10^{-16} eV \cdot s\right).$$

According to example Equation 8, the decoherence time of polarized intervalley states may have an order of micro-sec to mili-sec, which is comparable to that of the spin qubit. The unitary evolution U of the polarized intervalley states in the quantum dot 201 may be given as shown in example Equation 9.

$$U = \exp(-iHt) \qquad \text{[Equation 9]}$$

where H is the Hamiltonian as shown in example Equation 6.

As illustrated in FIG. 2, the $\sigma_x$ and $\sigma_z$ operations on the qubit in the quantum dot 201 may be achieved by applying gate voltage $V_{G1}$ and a microwave pulse to quantum dot 201. In one embodiment, the microwave pulse may be applied to the quantum dot 201 by the pico-second pulse generator at liquid helium temperature. In one example, as gate voltage $V_{G1}$ increases, the external electric field increases and thus the intervalley splitting energy 2Δ between the anti-symmetric state |1> and the symmetric state |0> increases as discussed above. When the microwave pulse with energy 2Δ is applied to the quantum dot 201, for example, the electron in the quantum dot 201 may evolve from the symmetric state |0> to the anti-symmetric state |1>, which corresponds to $\sigma_x$ operation whose behavior is similar to NOT gate. The $\sigma_z$ operation may be obtained by letting the electron in the quantum dot 201 evolve for a predetermined time, e.g., t=π/ε. The $\sigma_y$ operation may be obtained by combining the $\sigma_x$ and $\sigma_z$ operations as shown in example Equation 3. The intervalley splitting energy 2Δ has an order of 1 meV. The decoherence may be suppressed by the ambient temperature around 4K. The single qubit gate 200 may further include an error correction circuit (not shown) for preventing any stray field from leading to a change in the intervalley splitting energy or in the polarized intervalley states.

The quantum dot 202, for example, may be connected to the quantum dot 201 through the tunneling junction and act as a readout device. The quantum tunneling of an electron between the quantum dots 201, 202 may be parity dependent, i.e., whether an excess electron exists or not in the quantum dot 202. The qubit in the quantum dot 201 may be measured by adjusting the gate voltage $V_{G2}$ and the quantum dimension of the quantum dot 202 and setting $V_D$-$V_S$ to induce the tunneling. For example, the gate voltage $V_{G2}$ and the quantum dimension of the quantum dot 202 may be adjusted such that the symmetric states |0> of the quantum dots 201, 202 are in resonance while the anti-symmetric states |1> of the quantum dots 201, 202. After the qubit operation, the resulting quantum state may be measured by detecting the parity dependent tunneling of an excess charge at the readout quantum dot 202 using a quantum point contact or sensitive single electron capacitance technique.

Referring again to FIG. 1, in one example, after the single qubit operation 120 performs the right end operation $R_y^{-1}(\pm\pi/2)$ in example Equation 1, the $U_2(1/2)$ pseudo-SWAP gate 140 may perform the operation $U_2(1/2)$. To explain $U_2(1/2)$ operation in a pseudo-SWAP gate, FIG. 4 showing a schematic of the two-qubit quantum gate is referred.

Figure 4:
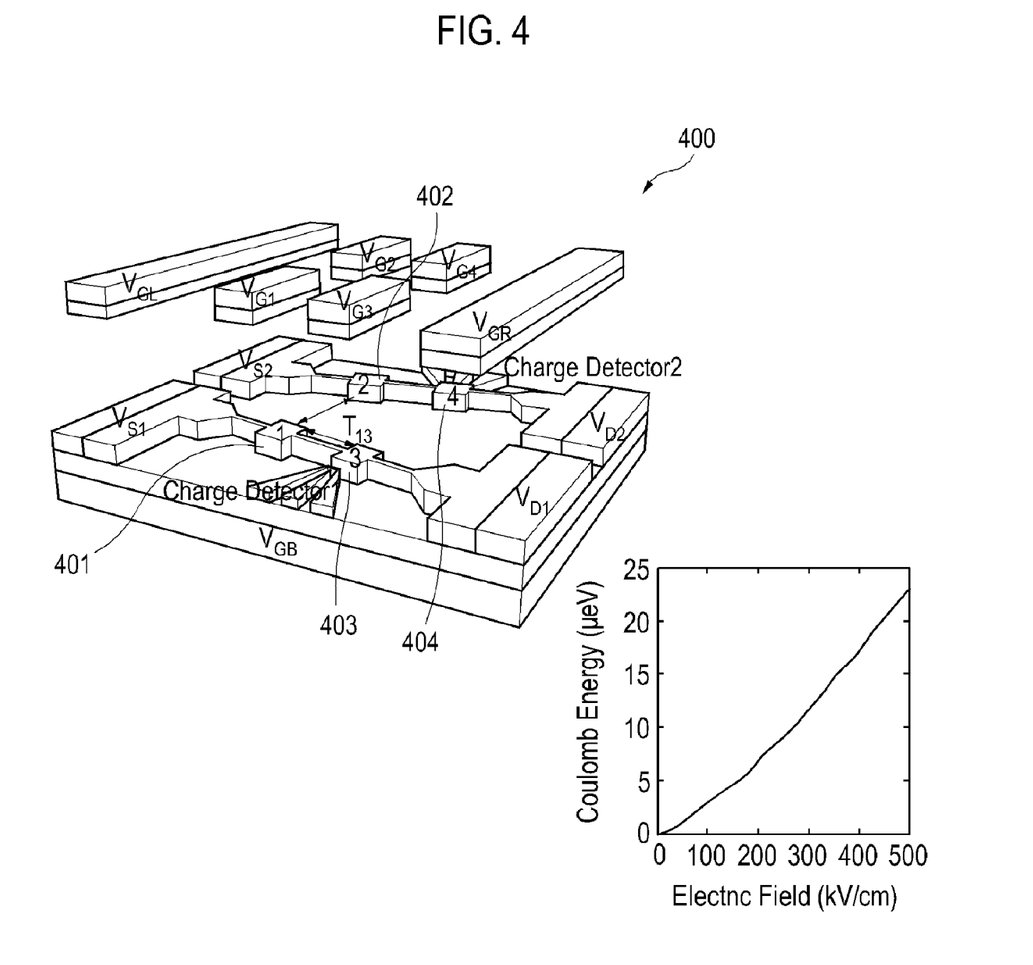
FIG. 4 is diagram showing an illustrative embodiment of a two-qubit gate.

FIG. 4 is diagram showing an illustrative embodiment of two-qubit gate 400. As illustrated in FIG. 4, the two-qubit gate 400 has similarities to the universal CNOT quantum gate 100. The two-qubit gate 400 may include a quantum dot 401 for a first qubit operation, a quantum dot 402 for a second qubit operation, a quantum dot 403 for readout of a first qubit operation and a quantum dot 404 for readout of a second qubit operation (charge detection). The two-qubit gate 400 may include a gate electrode VG1, VG2, VG3, VG4 to apply a gate voltage to the quantum dots 401, 402, 403, 404, respectively. Note that the two qubit gate 140, 150 illustrated in FIG. 1 does not include a readout quantum dot. This is because, for example, the readout quantum dot is connected to the end of the overall operations.

The qubit in the quantum dots 401, 402 may be represented by a state from among polarized intervalley states (e.g., symmetric or antisymmetric) of each electron in quantum dots 401 and 402. The quantum dots 401, 402 for two-qubit operation may be coupled by the inter-dot Coulomb interaction which is parity dependent. The Hamiltonian for the two-qubit gate 400 having the coupled quantum dots 401, 402 may be given as shown in example Equation 10.

$$H_{12} = \begin{bmatrix} E_{11} & 0 & 0 & 0 \\ 0 & E_{10} & E_c & 0 \\ 0 & E_c & E_{01} & 0 \\ 0 & 0 & 0 & E_{00} \end{bmatrix} \quad \text{[Equation 10]}$$

where the index 11 means that both qubits of the quantum dots 401, 402 are anti-symmetric states, i.e., |11>, the index 10 means that the first qubit in the quantum dot 401 is in an anti-symmetric state and the second qubit in the quantum dot 402 is in a symmetric state, i.e., |10>, the index 01 means that the first qubit in the quantum dot 401 is in a symmetric state and the second qubit in the quantum dot 402 is in an anti-symmetric state, i.e., |01>, and the index 00 means that both qubits of the quantum dots 401, 402 are in symmetric states, i.e., |00>. $E_{11}$, $E_{10}$, $E_{01}$ and $E_{00}$ are the example energy levels of the |11>, |10>, |01> and |00, respectively. $E_C$, for example, is inter-dot Coulomb interaction coupling energy and may have a range of about 0 meV to about 50 meV. In other embodiments, the inter-dot Coulomb interaction coupling energy may range from about 0 meV to about 5 meVs, from about 0 meVs to about 10 meVs, from about 0 meVs to about 20 meVs, from about 0 meVs to about 30 meVs, from about 0 meVs to about 40 meVs, from about 0.1 meVs to about 10 meVs, from about 0.1 meVs to about 7.5 meV, from about 0.1 meVs to about 5 meVs, from about 0.1 meVs to about 2.5 meVs, from about 0.1 meVs to about 1 meVs, from about 0.5 meVs to about 10 meVs, from about 0.5 meVs to about 15 meVs, from about 1 meV to about 2 meVs, from about 2 meVs to about 5 meVs, from about 5 meVs to about 7.5 meVs, from about 7.5 meVs to about 10 meVs, or from about 10 meVs to about 15 meVs.

In one example, $E_{11}$, $E_{10}$, $E_{01}$, $E_{00}$ and $E_C$ may be tuned by adjusting gate voltages VG1, VG2 and the dimension of the quantum dots 401, 402. For example, the gate voltages VG1, VG2 and the dimension of the quantum dots 401, 402 may be adjusted such that $E_{11}=2\Delta$, $E_{10}=E_{01}=0$, $E_{00}=-2\Delta$ and $E_C=\delta_2$. Then the Hamiltonian $H_{12}$ may be rewritten to $H_{12}^2$ as shown in example Equation 11.

$$H_{12}^2 = \begin{bmatrix} 2\Delta_2 & 0 & 0 & 0 \\ 0 & 0 & \delta_2 & 0 \\ 0 & \delta_2 & 0 & 0 \\ 0 & 0 & 0 & -2\Delta_2 \end{bmatrix} \quad \text{[Equation 11]}$$

The unitary evolution $U_2$ in the two-qubit gate 400 may be obtained by applying example Equation 11 to example Equation 9 and given as shown in example Equation 12.

$$U_2 = \exp(-iH_{12}^2 t) \quad \text{[Equation 12]}$$
$$= \begin{pmatrix} e^{-i2\Delta_2 t} & 0 & 0 & 0 \\ 0 & \cos\delta_2 t & -i\sin\delta_2 t & 0 \\ 0 & -i\sin\delta_2 t & \cos\delta_2 t & 0 \\ 0 & 0 & 0 & e^{i2\Delta_2 t} \end{pmatrix}.$$

Unitary evolution $U_2$ may be rewritten as shown in example Equation 13 with unitary evolution $U_2$ as shown in example Equation 12 and setting $\delta_2 t=\pi\alpha/2$ and $\Delta_2 t=4\pi\alpha$. The left side of $\delta_2 t=\pi\alpha/2$ and $\Delta_2 t=4\pi\alpha$ may be represented in the unit of the reduced Plank's constant (h-bar; η), e.g., $\delta_2 t=1 \cdot \eta$, $0.5 \cdot \eta$, $\pi \cdot \eta$, $$\frac{\eta}{4}$$

. . . etc. The time t may have a range of several pico seconds.

$$U_2(\alpha) = \begin{pmatrix} e^{-i8\pi\alpha} & 0 & 0 & 0 \\ 0 & \cos(\pi\alpha/2) & -i\sin(\pi\alpha/2) & 0 \\ 0 & -i\sin(\pi\alpha/2) & \cos(\pi\alpha/2) & 0 \\ 0 & 0 & 0 & e^{i8\pi\alpha} \end{pmatrix} \quad \text{[Equation 13]}$$

In one example, The above setting condition may be obtained by adjusting gate voltages VG1, VG2 and the dimension of the quantum dots 401, 402 such that $\Delta_2=8\delta_2$ and letting the electrons in the quantum dot 401, 402 to evolve for a time $t=\pi\alpha/2\delta_2$. As can be seen from the unitary evolution $U_{(SWAP)^\alpha}$ of $(SWAP)^\alpha$ gate as shown in Equation 14, $U_2$ is similar to $U_{(SWAP)^\alpha}$ and thus the two-qubit gate 400 having a unitary evolution $U_2$ may act as a pseudo $(SWAP)^\alpha$ gate.

$$U_{(SWAP)^\alpha} = \quad \text{[Equation 14]}$$
$$e^{i\pi\alpha/2} \begin{pmatrix} e^{-i\pi\alpha/2} & 0 & 0 & 0 \\ 0 & \cos(\pi\alpha/2) & -i\sin(\pi\alpha/2) & 0 \\ 0 & -i\sin(\pi\alpha/2) & \cos(\pi\alpha/2) & 0 \\ 0 & 0 & 0 & e^{-i\pi\alpha/2} \end{pmatrix}$$

Referring again to FIG. 1, for example, after the operations $U_2(1/2)R_y^1(\pm\pi/2)$ are performed by the single bit operation 120 and the U2(1/2) pseudo-SWAP gate 140, the single qubit gate 105 coupled to the quantum dot 104 of the U2(1/2) pseudo-SWAP gate 140 may perform $R_x^1(\pi)$ operation. Then, the U2(1/2) pseudo-SWAP gate 150 having a quantum dot 106 coupled to the single qubit gate 105 and a quantum dot 113 coupled to the quantum dot 112 of the U2(1/2) pseudo-SWAP gate 140 may perform $U_2(1/2)$ operation. The single qubit gate 114 coupled to the quantum dot 113 of the U2(1/2) pseudo-SWAP gate 150 may perform $R_x^2(\pm\pi/2)$ operation. The single qubit gate 107 coupled to the quantum dot 106 of the U2(1/2) pseudo-SWAP gate 150 may perform $R_x^1(\pi/2)$ operation. The single operation 110 may perform $R_y^1(\mu\pi/2)$ by combining the operations $\sigma_z$ operation with rotation angle $\pi/2$, $\sigma_x$ operation with rotation angle $\mu\pi/2$, and $\sigma_z$ operation with rotation angle $3\pi/2$ performed by the single qubit gates 108, 109, 110, respectively. After overall operations as shown in Equation 1, the resulting quantum state may be measured by detecting the parity dependent tunneling of an excess charge at the readout quantum dots 111, 115 using, for example, a quantum point contact or sensitive single electron capacitance technique.

According to an embodiment, the universal CNOT quantum gate may be provided wherein qubit is represented by a state from among polarized intervalley states of an electron in a quantum dot. Therefore, for example, the number of quantum dots necessary for a qubit operation may be reduced by half compared with the qubit using electron spins. Moreover, in one example, substantially all the qubit operation using the polarized intervalley states may be electrically controlled. Also, compared with a qubit derived from using electron spins, which requires both static and dynamic magnetic fields, it may be easier to control quantum states of an electron in a quantum dot in accordance with this embodiment. Additionally, the requirements for SWAP or pseudo SWAP operation, e.g., quantum dot dimension or evolving time, etc., may be relieved in accordance with this embodiment as compared with a qubit derived from using electron spins.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A universal quantum gate comprising:
    a single qubit gate including a quantum dot, the quantum dot to include a qubit, the qubit to be represented by a state from among polarized intervalley states of an electron in the quantum dot; and
    a two-qubit gate coupled to the single qubit gate and including a first quantum dot and a second quantum dot, the first quantum dot to include a first qubit, the first qubit to be represented by a state from among polarized intervalley states of an electron in the first quantum dot, the second quantum dot to include a second qubit, the second qubit to be represented by a state from among polarized intervalley states of an electron in the second quantum dot, wherein gate voltages to be applied to the first quantum dot and the second quantum dot are to be adjusted such that an energy level of the representative states of the first and second qubits is based on an integer multiple of an inter-dot Coulomb-energy level.

2. The universal quantum gate of claim 1, wherein the polarized intervalley states of the electron includes a symmetric state and an anti-symmetric state.

3. The universal quantum gate of claim 1, wherein the inter-dot Coulomb-energy level has a range of about 0.1 to 50 meV.

4. The universal quantum gate of claim 3, wherein the representative states of the first and second qubits comprises four states and the gate voltages to be applied to the first and second quantum dots are to be adjusted such that the maximum and minimum energy levels of the four states have a value with opposite signs and the remaining energy levels are zero.

5. The universal quantum gate of claim 4, wherein the gate voltages to be applied to the first and the second quantum dots is adjusted such that maximum energy level is 16 times of the inter-dot Coulomb-energy level.

6. The universal quantum gate of claim 1, wherein the two-qubit gate comprises the two-qubit gate to operate as a pseudo SWAP gate.

7. The universal quantum gate of claim 6, wherein a gate voltage and a microwave pulse are applied to the quantum dot of the single qubit gate and are to be adjusted such that the single qubit gate is to operate as a NOT gate.

8. The universal quantum gate of claim 6, wherein the electron in the quantum dot of the single qubit gate evolves for a time such that the single qubit gate is to operate as a selective phase shifter.

9. A universal quantum gate comprising:
    a first single qubit gate and a second single qubit gate, the first and the second single qubit gates each including a quantum dot, the quantum dot to include a qubit, the qubit to be represented by a state from among polarized intervalley states of an electron in the quantum dot; and
    a first two-qubit gate and a second two-qubit gate, the first and the second two-qubit gates each including a first quantum dot and a second quantum dot the first quantum dot to include a first qubit, the first qubit to be represented by a state from among polarized intervalley states of an electron in the first quantum dot, the second quantum dot to include a second qubit, the second qubit to be represented by a state from among polarized intervalley states of an electron in the second quantum dot,
    wherein the first single qubit gate is coupled to the first quantum dot of the first two-qubit gate, the first quantum dot of the first two-qubit gate is coupled to the second single qubit gate, the second single qubit gate is coupled to the first quantum dot of the second two-qubit gate, the second quantum dot of the first two-qubit gate is coupled to the second quantum dot of the second two-qubit gate, and
    wherein gate voltages to be applied to each of the first and second quantum dots of the first and second two-qubit gates are to be adjusted such that an energy level of the representative states of the first and second qubits are based on an integer multiple of an inter-dot Coulomb-energy level.

10. The universal quantum gate of claim 9, wherein the polarized intervalley states of the electron includes a symmetric state and an anti-symmetric state.

11. The universal quantum gate of claim 9, wherein the inter-dot Coulomb-energy level has a range of about 0.1 to 50 meV.

12. The universal quantum gate of claim 9, wherein the first and second two-qubit gates comprises the first and second two-qubit gates to operate as a pseudo SWAP gate.

13. The universal quantum gate of claim 12, wherein a gate voltage and a microwave pulse are applied to the quantum dot of the second single qubit gate and are to be adjusted such that the second single qubit gate is to operate as a NOT gate.

14. The universal quantum gate of claim 12, wherein the electron in the quantum dot of the first single qubit gate evolves for a time such that the first single qubit gate is to operate as a selective phase shifter.

15. The universal quantum gate of claim 12, further comprising:
    a third single qubit gate and a fourth single qubit gate, the third and the fourth single qubit gates serially couple to the first single qubit gate, the third and the fourth single qubit gates each including a quantum dot, the quantum dot to include a qubit, the qubit to be represented by a state from among polarized intervalley states of an electron in the quantum dot,
    wherein each electron in the quantum dots of the first and fourth single qubit gates evolves for a time such that the single qubit gates are to operate as a selective phase shifter and a gate voltage and a microwave pulse applied to the quantum dot of the third single qubit gate are to be adjusted such that the third single qubit gate is to operate as a NOT gate.

16. The universal quantum gate of claim 15, wherein the polarized intervalley states of the electron includes a symmetric state and an anti-symmetric state.

17. A universal quantum gate comprising:
a two-qubit gate including a first quantum dot and a second quantum dot, the first quantum dot to include a first qubit, the first qubit to be represented by a state from among polarized intervalley states of an electron in the first quantum dot, the second quantum dot to include a second qubit, the second qubit to be represented by a state from among polarized intervalley states of an electron in the second quantum dot,
wherein gate voltages to be applied to the two quantum dots of the two-qubit gate are to be adjusted such that the two-qubit gate is to perform a pseudo SWAP operation.

18. The universal quantum gate of claim 17, wherein the polarized intervalley states of the electron includes a symmetric state and an anti-symmetric state.

19. The universal quantum gate of claim 17, wherein unitary evolution of the pseudo SWAP operation is represented by a matrix of $$\begin{pmatrix} e^{-i8\pi\alpha} & 0 & 0 & 0 \\ 0 & \cos(\pi\alpha/2) & -i\sin(\pi\alpha/2) & 0 \\ 0 & -i\sin(\pi\alpha/2) & \cos(\pi\alpha/2) & 0 \\ 0 & 0 & 0 & e^{i8\pi\alpha} \end{pmatrix},$$

$\alpha$ is any real number.

20. The universal quantum gate of claim 17, wherein the gate voltages applied to each of the first and second quantum dots of the two-qubit gate are to be adjusted such that an energy level of the representative states of the first and second qubits is based on an integer multiple of an inter-dot Coulomb-energy level.

21. The universal quantum gate of claim 20, wherein the inter-dot Coulomb-energy level has a range of about 0.1 to 50 meV.

* * * * *

UNITED STATES PATENT AND TRADEMARK OFFICE
CERTIFICATE OF CORRECTION

PATENT NO.        : 7,655,850 B1
APPLICATION NO. : 12/198842
DATED             : February 2, 2010
INVENTOR(S)       : Doyeol Ahn It is certified that error appears in the above-identified patent and that said Letters Patent is hereby corrected as shown below:

At Column 3, Lines 57-61, please correct Equation 4 by deleting:

$$U_2(a) = \begin{pmatrix} e^{-i8\pi a} & 0 & 0 & 0 \\ 0 & \cos(\pi a/2) & -i\sin(\pi a/2) & 0 \\ 0 & -i\sin(\pi a/2) & \cos(\pi a/2) & 0 \\ 0 & 0 & 0 & e^{i8\pi a} \end{pmatrix}$$

" "
and insert $$U_2(\alpha) = \begin{pmatrix} e^{-i8\pi\alpha} & 0 & 0 & 0 \\ 0 & \cos(\pi\alpha/2) & -i\sin(\pi\alpha/2) & 0 \\ 0 & -i\sin(\pi\alpha/2) & \cos(\pi\alpha/2) & 0 \\ 0 & 0 & 0 & e^{i8\pi\alpha} \end{pmatrix}$$

-- --, therefor;

At Column 4, Line 45, please delete "A" and insert --$\Delta$--, therefor.

Signed and Sealed this

Fourteenth Day of September, 2010

David J. Kappos
*Director of the United States Patent and Trademark Office*